United States Patent
Parazak et al.

(10) Patent No.: US 6,300,391 B2
(45) Date of Patent: *Oct. 9, 2001

(54) INKS CONTAINING GLYCOL ETHERS AND SPECIFIC POLYMERS FOR DRY TIME AND BLEED IMPROVEMENTS IN INK-JET PRINTING INKS

(75) Inventors: Dennis P Parazak; Palitha Wickramanayake, both of Corvallis, OR (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/411,362

(22) Filed: Oct. 1, 1999

Related U.S. Application Data

(63) Continuation-in-part of application No. 09/183,219, filed on Oct. 29, 1998.

(51) Int. Cl.[7] .............................. C09D 11/10; C08L 33/02; C08L 33/08; C08L 33/10; C08L 33/26
(52) U.S. Cl. ........................... 523/160; 524/555; 524/560
(58) Field of Search ................................... 523/160, 161; 526/318.1, 318.3, 318.44, 328.5, 329.7; 524/560, 555; 106/31.6

(56) References Cited

U.S. PATENT DOCUMENTS

| | | | |
|---|---|---|---|
| 4,136,076 | 1/1979 | Daniels ......................... | 260/29.6 HN |
| 4,545,818 | * 10/1985 | Inoue et al. ........................ | 106/31.38 |
| 5,085,698 | * 2/1992 | Ma et al. .............................. | 524/388 |
| 5,156,675 | * 10/1992 | Breton et al. ...................... | 106/31.43 |
| 5,181,045 | 1/1993 | Shields et al. ........................ | 346/1.1 |
| 5,198,023 | 3/1993 | Stoffel ................................ | 106/22 R |
| 5,272,201 | 12/1993 | Ma et al. ............................. | 524/505 |
| 5,316,575 | 5/1994 | Lent et al. ........................... | 106/20 R |
| 5,320,668 | 6/1994 | Shields et al. ..................... | 106/20 R |
| 5,428,383 | 6/1995 | Shields et al. ........................... | 347/96 |
| 5,476,540 | 12/1995 | Shields et al. ..................... | 106/20 R |
| 5,488,402 | 1/1996 | Shields et al. ........................... | 347/96 |
| 5,518,534 | 5/1996 | Pearlstine et al. ................. | 106/20 R |
| 5,536,306 | 7/1996 | Johnson et al. ..................... | 106/22 R |
| 5,536,761 | 7/1996 | Fujita ................................... | 523/160 |
| 5,555,008 | 9/1996 | Stoffel et al. ......................... | 347/100 |
| 5,618,338 | * 4/1997 | Kurabayashi et al. ............. | 106/31.37 |
| 5,623,294 | 4/1997 | Takizawa et al. ...................... | 347/98 |
| 5,648,405 | * 7/1997 | Ma et al. .............................. | 523/160 |
| 5,679,143 | 10/1997 | Looman ............................. | 106/20 R |
| 5,686,508 | * 11/1997 | Shimomura et al. ................ | 523/161 |
| 5,695,820 | 12/1997 | Davis et al. .......................... | 427/261 |
| 5,696,182 | 12/1997 | Kashiwazaki et al. .............. | 523/161 |
| 5,700,317 | 12/1997 | Adamic .............................. | 106/31.58 |
| 5,712,338 | 1/1998 | Donovan et al. ..................... | 524/505 |
| 5,713,993 | 2/1998 | Grezzo Page et al. ........... | 106/31.85 |
| 5,730,790 | 3/1998 | Rehman ............................. | 106/31.59 |
| 5,744,519 | * 4/1998 | Heraud et al. ....................... | 523/160 |
| 5,785,743 | 7/1998 | Adamic et al. .................... | 106/31.27 |
| 5,849,815 | * 12/1998 | Aoki et al. ........................... | 523/161 |
| 5,889,083 | * 3/1999 | Zhu ...................................... | 523/161 |
| 5,948,512 | * 9/1999 | Kubota et al. ....................... | 428/195 |
| 5,958,121 | * 9/1999 | Lin ..................................... | 106/31.43 |
| 5,998,501 | * 12/1999 | Tsutsumi et al. ................... | 523/160 |
| 6,020,400 | * 2/2000 | Anton et al. ......................... | 523/161 |
| 6,040,358 | * 3/2000 | Page et al. ........................... | 523/161 |
| 6,051,645 | * 4/2000 | Suzuki et al. ........................ | 524/500 |

FOREIGN PATENT DOCUMENTS

| | | |
|---|---|---|
| 0633142 | 1/1995 | (EP) . |
| 0838507A1 | 4/1998 | (EP) . |
| 0997506 | 5/2000 | (EP) . |

OTHER PUBLICATIONS

Dean, John A. "Lange's Handbook of Chemistry" 15th Ed., McGraw–Hill New York (pp. 8.33, 8.50, 8.56, 8.63–8.65), 1999.*

Morrison, Robert Thornton and Boyd, Robert Neilson; "Organic Chemistry" 5ed., Allyn and Bacon Boston (p. 839), 1987.*

Personal Care Polymers: Specialty Products from National Starch and Chemical Company, RESYN 28–2930, "Excellent Holding Power For Hair Sprays", pp. 1–10. (1994).

Personal Care Polymers: Specialty Products from National Starch and Chemical Company, AMPHOMER 28–4910, "For Hard Holding Hair Fixative Formulations", pp.: 1–5. (1994).

Personal Care Polymers: Specialty Products from National Starch and Chemical Company, AMPHOMER LV–71 (28–4971), "For Hard Holding Hair Fixative Formulations", pp: 1–6. (1996).

Personal Care Polymers: Specialty Products from National Starch and Chemical Company, LOVOCRYL 47, "Specialty Polymer For Low VOC Hair Sprays", pp: 1–6. (1994).

\* cited by examiner

Primary Examiner—Vasu Jagannathan
Assistant Examiner—Callie E. Shosho
(74) Attorney, Agent, or Firm—Michael D. Jones

(57) ABSTRACT

The ink set of this invention comprises at least two inks, one of which contains a pH sensitive polymer, a glycol ether, and preferably a self-dispersing pigment colorant. A second ink is provided which comprises incompatible inorganic or organic salts or has an appropriate pH. The polymer precipitates onto a medium upon contact with the second ink, thereby providing improved dry time as well as bleed and halo control.

17 Claims, 2 Drawing Sheets

INKS CONTAINING GLYCOL ETHERS AND SPECIFIC POLYMERS FOR DRY TIME AND BLEED IMPROVEMENTS IN INK-JET PRINTING INKS

CROSS REFERENCE TO RELATED APPLICATIONS

This patent application is a continuation-in-part of U.S. patent application Ser. No. 09/183,219, filed Oct. 29, 1998, pending.

TECHNICAL FIELD

The present invention relates to ink-jet inks employed in ink-jet printing. In particular, this invention relates to an ink system that utilizes dyes or pigments, including self-dispersing pigments, specific polymers, and glycol ether solvents to significantly reduce the dry time and black to color bleed of the ink when applied to a substrate.

BACKGROUND ART

Ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble of ink in the chamber, which expels ink through the nozzle toward the print medium. In this way, firing of a plurality of such resistor elements in a particular order in a given primitive forms alphanumeric characters, performs area-fill, and provides other print capabilities on the medium.

Ink-jet inks, when printed on various substrates, including bond paper, copier paper, and other cellulosic media, require a period of time in which to dry. Smears and smudges can occur while the ink is still wet or tacky on the surface of the paper being printed on. Moreover, the speed of the printer itself is affected by the ink dry time. The longer it takes for the ink to dry, the longer the printer must delay release of the freshly printed paper so that the ink can dry on the sheets of paper to a sufficient point so that the sheets do not smudge on another.

Moreover, many ink-jet inks, when printed in various colors on bond paper, copier paper, and other media, can lead to bleed and halo. Bleed and halo occur as colors mix both on the surface of the paper being printed on and in the paper. The terms "bleed" and "halo", as used herein, are defined as follows. When inks of two different colors are printed next to each other, it is desired that the border between the two colors be clean and free from the invasion of one color into the other. When one color does invade into the other, the border between the two colors becomes ragged, and this is called bleed. This is in contradistinction to uses of the term "bleed" in the prior art, which often defines "bleed" in the context of ink of a single color following the fibers of the paper. When dye-based inks are printed adjacent to pigment-based inks, the dye-based ink may invade the pigmented ink causing a whitish edge to form in the pigmented ink. This is known as halo, and is most often observed when dye-based color inks are printed adjacent to pigment-based black inks.

Prior solutions to bleed have largely involved the use of heated platens or other heat sources and/or special paper. Heated platens add cost to the printer. Special paper limits the user to a single paper, which is of a higher cost than a plain paper. Another way to reduce bleed involves increasing the penetration rate of the ink into the paper. However, increasing the penetration rate reduces the edge acuity (lowers the print quality of the ink). Nevertheless, this method is acceptable for printing color ink because of the lesser importance of color text quality. However, print quality is important for black ink. Hence, alternate bleed control mechanisms are needed.

U.S. Pat. No. 5,428,383 teaches a method to control bleed in multicolor ink-jet printing involving the use of multi-valent metal salts as precipitation agents in a first ink composition. The precipitation agent is designed to react with the coloring agent in a second ink composition.

A solution to the specific problem of black to yellow color bleed is disclosed in U.S. Pat. No. 5,198,023 wherein multivalent cations such as calcium chloride and magnesium chloride are added at concentrations ranging from about 1 to about 10 wt % to yellow cationic inks to prevent bleed between yellow and black inks. However, it has been determined that the addition of large amounts of multivalent cations to thermal ink-jet ink compositions may induce precipitation of dye salts, requiring further adjustments in the ink composition. U.S. Pat. No. 5,518,534 teaches the use of a first ink having a pigment dispersion and the second ink containing a salt of an organic acid or mineral acid wherein said salt reacts with said first ink to alleviate bleed between the inks. However, in this case, the pigment requires the presence of a dispersing agent, and both inks must have the same ionic character.

A method to control bleed is also disclosed by U.S. Pat. No. 5,730,790. The ink-jet ink is formulated to comprise at least one dye-based ink composition and at least one pigment-based ink. The dye-base ink also contains a cationic surfactant, and the pigment-base ink contains a negatively charged dispersant.

Another method of reducing bleed between ink-jet inks involves the use of pH-sensitive dyes as disclosed in U.S. Pat. No. 5,181,045. It discloses an ink having a pH-sensitive dye to prevent bleeding to an adjacent ink having an appropriate pH. Migration of the ink having the pH-sensitive dye is prevented by rendering the dye insoluble on the page by contact with the pH of the adjacent ink. This method requires a pH differential of about 4 or 5 units to completely control bleed. Accordingly, a pH not exceeding 4 would be required to effectively eliminate bleed from a pH-sensitive ink having a typical pH of about 8.

U.S. Pat. No. 5,6579,143 builds upon the '045 case referenced above, but an organic acid component is added to the so-called target ink-jet ink composition, as opposed to the pH-sensitive ink composition. The organic acid component reduces the pH differential required to control bleed to about 3 units or less.

While there have been many attempts by industry to produce fast drying inks with good bleed control, a need still remains for ink compositions for use in ink-jet printing which have faster dry time when printed on plain papers as well as maintaining other desirable properties of such inks, such as waterfastness, bleed control, and halo control.

SUMMARY OF INVENTION

In accordance with the invention, fast drying inkjet inks which also have good bleed and halo control are provided; they comprise certain colorants, glycol ether solvents and one or more polymers.

All concentrations herein are in weight percent, unless otherwise indicated. The purity of all components is that employed in normal commercial practice for ink-jet inks. All references are hereby incorporated by reference.

DETAILED DESCRIPTION OF THE INVENTION

Figure 1:
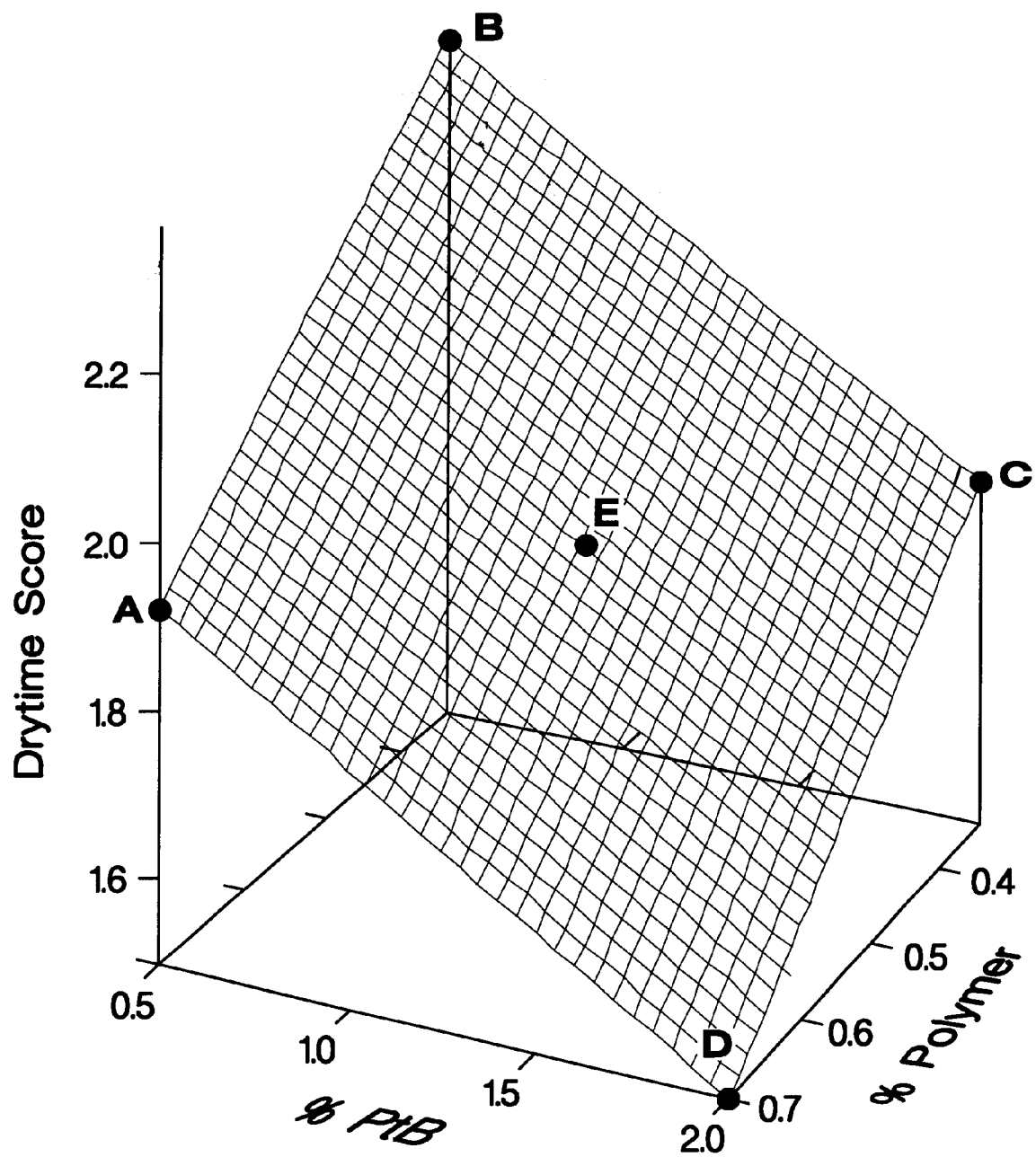
FIG. 1 is a three dimensional plot of drytime versus the percentage of glycol ether (in this case propylene glycol t-butyl ether, PtB) and pH sensitive polymer (Balance 47™, available from National Starch) present in the ink. A table explaining the data points A, B, C, D, and E is shown in the Example.

Certain specific polymers have been found to precipitate under certain pH conditions and in the presence of certain ions and glycol ether, allowing the use of a broader class of colorants, particularly self-dispersing pigments, which previously have not been widely utilized. Use of these specific polymers also allows formulation flexibility because these polymers do not contribute to the dispersion or water-solubility of the colorants, so new classes of polymers can be utilized for bleed control without concern of their ability to disperse. By utilizing self-dispersing pigments, the polymers of this invention can be designed to be pH and/or ion sensitive, yet have little dispersing ability.

In addition to their enhancement of bleed performance, the polymers also aid in penetration of the black ink vehicle into the print medium, inducing faster dry times. Dry time is further enhanced when a color ink, that is either buffered at a pH that causes the polymer to precipitate or contains ions that are incompatible with the polymer, is immediately printed under and/or over the pigmented black ink. Precipitation of the polymer causes flocculation of the pigment into larger agglomerated particles, allowing the vehicle to drain into the paper at a faster rate.

When surfactants are used for the purpose of drytime improvement, one often sees a concomitant bleed control improvement, however, often at the expense of print quality—more specifically, edge acuity. Glycol ethers on the other hand, being much less surface active, when used in "small" quantities do not degrade print quality, but do improve drytime. This is especially so when the black ink containing the glycol ether is underprinted with an appropriate color ink.

Glycol ethers are well known for their excellent solvency for polymers. In addition to the dry time/bleed control benefits gained by the presence of glycol ethers, inks described here do benefit from the glycol ethers' ability to keep the polymers in solution when water evaporates and the non volatiles concentrate during pen idle.

Without subscribing to any particular theory, Applicants believe that by combining certain polymers with glycol ethers, inks can be formulated to have significantly reduced dry time, as well as helping to reduce bleed between the inks without degrading pen reliability.

Polymers

The polymers of this invention can be random or block copolymers. In addition to contributing to good dry time, the polymers are selected to precipitate with a change of pH or in the presence of certain ions or both. In general, polymers which precipitate with a change from higher to lower pH will comprise monomers containing an acidic group and a hydrophobic group; polymers which precipitate with a change from lower to high pH will comprise monomers containing amine functionality and hydrophobic moieties. The structures of the polymers of this invention are:

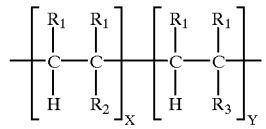

wherein $R_1$ are independently selected from H or a $C_1$–$C_{18}$ substituted or unsubstituted, branched or unbranched, alkyl, aromatic, or cyclic chain and may contain halogen, ester, ether, amine or amide functionalities, and is preferably H, $CH_3$, a halogen or a halogenated methyl group; and $R_2$ is a group containing either a carboxylic acid group having a $pK_a$ of from about 5 to about 7.5, or a primary, secondary, or tertiary amine functionality. $R_3$ is a $C_1$–$C_{18}$ substituted or unsubstituted, branched or unbranched, alkyl, aromatic, or cyclic chain, which may contain ester, ether, amine or amide functionalities. Examples of monomers of type X that contain carboxylic acids that are useful in the invention include, but are not limited to; acrylic acid, methacrylic acid, crontonic acid, 2-trifluoromethylacrylic acid and 2-bromoacrylic acid. Typically, polymers containing acidic $R_2$ monomers will be present in the ink as acid salts of Na, K, Li, triethanolamine, 2-amino-2-methyl-1 propanol and the like. Examples of monomers of type X that contain primary, secondary, and tertiary amines that are useful in the invention include, but are not limited to; 2-(diethylamino)ethyl acrylate, 2-(dimethylamino)ethyl acrylate, 3-(dimethylamino)propyl acrylate, butylaminoethyl methacrylate, 2-aminoethyl methacrylate and N-[3-(dimethylamino)propyl]acrylamide. Typically, polymers containing primary secondary, and/or tertiary amine $R_2$ monomers alone will be present in the ink as salts of Cl, Br, I, sulfate, nitrate, and the like. Hydrophobic monomers of type Y that are useful in the invention include, but are not limited to; methyl and ethyl esters of acrylic and methacrylic acids, ethyl-2-(bromomethyl) acrylate, propyl acrylates and methacrylates, butyl acrylates and methacrylates, isoamyl acrylate, hexyl acrylates and methacrylates, cyclohexyl acrylates and methacrylates and their alkyl derivatives, ethylhexyl acrylates and methacrylates, trimethylhexyl acrylate, isooctyl acrylate, isodecyl acrylate, dodecyl acrylate, tridecyl methacrylate, octadecyl acrylate, isobornyl acrylate and methacrylate, phenyl methacrylate, benzyl methacrylate, 2-butoxyethyl acrylate and methacrylate, 2-ethoxyethyl acrylate, neopentyl glycol acrylate benzoate, ethylene glycol phenyl ether acrylate, hydroxybutyl acrylate, alkyl esters of crotonic acid, N,N-dimethylacrylamide, N-isopropylacrylamide and methacrylamide, N-octylacrylamide, N(butoxymethyl) acrylamide, N-(isobutoxymethyl)acrylamide, methyl-2-acrylamido-2-methoxyacetate, vinyl acetate, vinyl neodecanoate, cyclohexyl vinyl ether, 2-ethylhexyl vinyl ether and styrene. Polymers of this invention may contain more than one X-type or Y-type monomer.

The average molecular weight of the polymers of this invention ranges from about 1,000 to about 20,000, preferably from about 1,000 to about 12,000; more preferably from about 3,000 to about 10,000. The above monomers are provided in sufficient amounts to provide a polymer that will be stable when solubilized in water yet will effectively precipitate and flocculate the pigment upon the change in pH or contact with the appropriate ions. Thus, polymers may be selected which comprise other monomers as long as an effective amount of the above monomers comprise part of the polymer chain. Polymers of this invention may contain monomers of more than one X-type, Y-type, or both, in addition to other monomers chosen by the formulator.

In a preferred embodiment, $R_2$ is a carboxylic acid moiety, thus having the structure:

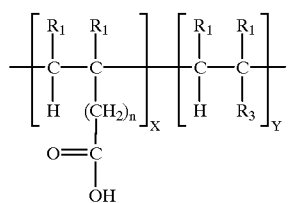

wherein $R_1$ are independently selected from H or a $C_1$–$C_{18}$ substituted or unsubstituted, branched or unbranched, alkyl, aromatic, or cyclic chain and may contain ester, ether, amine or amide functionalities, and is preferably H, $CH_3$, a halogen or a halogenated methyl group; and n is from 0 to 15, preferably 0 to about 3, so long as the group has $PK_a$ of from about 5 to about 7.5. $R_3$ is a $C_1$–$C_{18}$ substituted or unsubstituted, branched or unbranched, alkyl, aromatic, or cyclic chain, which may contain ester, ether, amine or amide functionalities.

The acidity, measured by the acid number, of these polymers are in the range of 55–400 mg KOH/g of polymer; preferably from 80–350 mg KOH/g of polymer; more preferably from 80–200 mg KOH/g of polymer. When the polymers have X-type monomers without acidic groups and the $R_2$ groups contain primary, secondary, and/or tertiary amine functionality, the amount of basic nitrogen in the polymer, measured as the meq of basic nitrogen per gram, ranges from between about 1 to about 7 meq/g, preferably about 1.5 to about 6.2 meq/g and even more preferably between about 1.5 to about 3.5 meq/g.

The following examples of polymers that are useful in this invention are not intended to limit the scope of the invention. Monomer ratios are given in weight percent. Molecular weights conform to the ranges given above. Examples; a) 8:92 acrylic acid:butyl acrylate, acid number 62 mg KOH/g; b) 10:90 methacrylic acid:butyl acrylate, acid number 65 mg KOH/g; c) 12:88 acrylic acid:ethyl acrylate, acid number 93 mg KOH/g; d) 14:86 methacrylic acid:ethyl acrylate, acid number 91 mg KOH/g; e) 16:60:24 acrylic acid:methyl methacrylate:hexyl acrylate, acid number 125 mg KOH/g; f) 16:5:15:64 acrylic acid:butylaminoethyl methacrylate:octylacrylamide:methylmethacrylate, acid number 125 Mg KOH/g; g) 19:40:41 methacrylic acid:ethyl acrylate:methyl methacrylate, acid number 124 mg KOH/g; h) 30:30:30 methacrylic acid:methyl methacrylate:benzyl methacrylate, acid number 195 mg KOH/g; and i) 44:56 acrylic acid:ethyl acrylate, acid number 325 mg KOH/g. Other combinations could also be made. Some modifications could be made by those skilled in the art and still be within the spirit of the invention.

Polymers that have acidic groups, such as carboxylate groups, are pH sensitive. These carboxylated, or otherwise acidified, polymers will either be in solution or precipitate based on their pH-dependant solubility. As the pH is lowered and the carboxylate groups become protonated, the solubility of the polymer decreases. At some point, the polymer will begin to become unstable and will effectively drop out of solution. Typical polymers for use herein include those having at least one and preferably multiple carboxyl groups, which commonly consist of acrylic monomers and polymers known in the art. Hydrophobic moieties are also required to aid in the precipitation of the polymer and induce flocculation of the pigment in an aqueous based ink. When the polymer carries a net anionic charge, the pigment must also carry a net anionic or nonionic charge.

While not bound by theory, it is believed that the present invention involves what is essentially a boundary effect. The drastic pH conditions of the two inks in question or the presence of incompatible ions in one of the inks bring about the desired effect (bleed control) at the boundary of the two inks. Moreover, improved bleed control as well as improved dry time is also observed when the inks are over and/or under printed onto each other.

Finally, it should be mentioned that using a second ink with a pH of, for example, 4 will have a much greater effect on the solubility of the pH-sensitive polymer than will any pH change caused by the pH of the paper medium. Paper-induced pH changes in the ink are small compared to contact with a fluid that is buffered at a pH of 4. Thus, while it is thought that the pH of the paper itself contributes to an improvement of bleed control, in the present application, a second ink, having a pH low enough to bring about insolubility of polymers in the first ink or the presence of specific polymer-incompatible ions, is used to bring about the desired effect, i.e., bleed and halo reduction.

While the specific example given is directed to the use of an ink having a lower pH than the first ink, it is also possible to employ an ink having a higher pH than the initial ink. In this case, the pH-sensitive ink would have the property that it precipitates as the pH is increased. For example, if the polymer is soluble at a low pH by carrying a positive charge through protonation of an amine group on the polymer, it is possible to precipitate the polymer by contacting it with a second ink that is buffered at a high pH causing deprotonation of the polymer. This system would work in conjunction with pigments that are either dispersed by nonionic or with a cationic charged moieties or with self-dispersing pigments that have been modified to carry a net positive charge.

The effect on bleed and dry time may be seen at a pH difference of about 1 to 3 units. Further and near complete control of bleed results when the pH difference is further increased, to about 4 to 5 units. However, these values do not preclude the use of a polymer which is more sensitive to pH than those disclosed herein; with more sensitive pH-polymers, near complete control of bleed could result with only a small difference in pH, considerably less than 4 units.

Glycol Ether Solvents

In addition to the polymers discussed above, the ink compositions of this invention comprise one or more glycol ethers or poly(glycol) ethers as solvents. Examples of suitable glycol ethers are ethylene glycol alkyl ethers, propylene glycol alkyl ethers, poly(ethylene glycol) alkyl ethers, higher homologues of poly(ethylene glycol) alkyl ethers, poly(propylene glycol) alkyl ethers, higher homologues of poly(propylene glycol) alkyl ethers.

Colorants

In one embodiment herein the black pigment is dispersed in the ink composition with the aid of a dispersing agent.

Such black pigments include any black pigment that is dispersed with a dispersant having an anionic functionality, for example, the Joncryl® polymers available from S.C. Johnson Polymer (Racine, Wis.). Of course, any other dispersant exhibiting anionic charges may be employed in the practice of this invention. For a more complete discussion of black pigments and anionic dispersants see U.S. Pat. No. 5,181,045 and U.S. Pat. No. 5,785,743.

The following pigments are examples of available black pigments from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4.

Color inks typically comprise dyes or pigments. The dye or pigments may be nonionic, cationic, anionic, or mixtures thereof. Any of the color dyes or pigments known for use in ink-jet printing may be employed in the practice of this invention.

The following pigments are useful in the practice of this invention; however, this listing is not intended to limit the invention. The following pigments are available from BASF: Paliogen® Orange, Heliogen® Blue L 6901F, Heliogen® Blue NBD 7010, Ileliogen® Blue K 7090, Heliogen®Blue L 7101F, Paliogen® Blue L 6470, Heliogen® Green K 8683, and Heliogen® Green L, 9140. The following pigments are available from Cabot: Monarch® 1400, Monarch® 1300, Monarch® 1100, Monarchs 1000, Monarch® 900, Monarch®880, Monarch® 800, and Monarch® 700. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chem: L74-1357 Yellow, L75-1331 Yellow, and L75-2577 Yellow.

Aqueous color dyes may be employed in the practice of the present invention. Examples of water-soluble dyes include the sulfonate and carboxylate dyes, specifically, those that are commonly employed in ink-jet printing. Specific examples include: Sulforhodamine B (sulf:)nate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thiolacin T (Basic Yellow 1), and Auramine O (Basic Yellow 2), all available from Aldrich Chemical Company.

One type of preferred colorant employed in the inks of this invention is a self-dispersing pigment. Such pigments suitable for use herein include all chemically modified water-dispersible, pigments known for use in ink-jet printing. These chemical modifications impart water-dispersibility to the pigment precursors that encompass all organic pigments.

For self-dispersibility or water solubility, the pigments herein are modified by the addition of one or more organic groups comprising at least one aromatic group or a C1–C12 alkyl group and at least one ionic group or ionizable group. The ionizable group is one that forms its ionic groups in the aqueous medium. The ionic group may be anionic or cationic. The aromatic groups may be further substituted or unsubstituted. Examples include phenyl or napthyl groups and the ionic group is sulfonic acid, sulfinic acid, phosphonic acid, carboxylic acid, ammonium, quaternary ammonium, or phosphonium group.

Depending on the process selected, the pigment can either be anionic or cationic in character. As commercially available, the anionic chromophores are usually associated with sodium or potassium cations, and the cation chromophores are usually associated with chloride or sulfate anions.

For modification, one preferred method is treatment of the carbon black pigment with aryl diazonium salts containing at least one acidic functional group. Examples of aryl diazonium salts include those prepared from sulfanilic acid, 4-aminobenzoic acid, 4-aminosalicylic acid, 7-amino-4-hydroxy-2-naphthlenesulfonic acid, aminophenylboronic acid, and aminophenylphosphonic acid and metanilic acid.

Ammonium, quaternary ammonium groups, quaternary phosphonium groups, and protonated amine groups represent examples of cationic groups that can be attached to the same organic groups discussed above.

See U.S. Pat. Nos. 5,707,432; 5,630,868; 5,571,311; and 5,554,739 for a discussion of modified carbon black pigments and methods of attaching the functionalized groups.

The following pigments are useful in the practice of this invention; however, this listing is not intended to limit the invention. The following pigments available from Cabot may be appropriately surface modified for the purpose of use in this invention: Monarch® 1400, Monarch® 1300, Monarch® 1100, Monarch® 1000, Monarch® 900, Monarch® 880, Monarch® 800, and Monarch® 700. Likewise the following pigments available from Columbian may be appropriately surface modified: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S170, Special Black 6, Special Black 5, Special Black 4A, Special Black 4, Printex U, Printex 140U, Printex V, and Printex 140V. Tipure® R-101 is available from DuPont. Cab-O-Jet® 200 and Cab-O-Jet® 300 from Cabot is surface modified and may be used as is.

Ink-jet Ink Vehicle

The ink compositions of this invention comprise the colorants, polymer(s), and glycol ether solvents, in addition to other conventional ink adjuncts to the ink vehicle. For a discussion of inks and their properties, see *The Printing Manual*, 5$^{th}$ ed. Leach et al. (Chapman and Hall, 1993). See also U.S, Pat. Nos. 2,833,736; 3,607,813; 4,104,061; 4,770, 706; and 5,026,755.

A typical formulation for an ink useful in the practice of the invention includes the colorant (about 0.001% to about 10 wt %), one or more glycol ether solvents (about 0.01 to about 20 wt %, preferably about 0.01 to about 7%, more preferably about 0.01 to about 4%), optionally one or more water-soluble surfactants/amphiphiles (0 to about 5, preferably about 0.1 to about 2 wt %), and water (balance). Of course, the inks contain the polymer(s), present in an amount of from about 0.1 to about 10% by wt of the ink composition, preferably from about 0.1 to about 3%.

One or more additional cosolvents may be added to the vehicle in the formulation of the ink. Classes of cosolvents employed in the practice of this invention include, but are not limited to, aliphatic alcohols, aromatic alcohols, diols, caprolactams, lactones, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from about 0.01 to about 50 wt %, with about 0.1 to 20 wt % being preferred.

Water-soluble surfactants may be employed in the formulation of the vehicle of the ink. These surfactants are added as free components to the ink formulation and are not otherwise associated or intended to become part of the polymers described herein. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; POE amides; and dimethicone copolyols. Amphoteric surfactants such as substituted amine oxides are useful in the practice of this invention. Cationic surfactants such as protonated POE amines may also be used. U.S. Pat. No. 5,106,416, discloses more fully most of the surfactants listed above. The non-ionic amphiphiles/surfactants are more preferred than the ionic surfactants. Specific examples of amphiphiles/surfactants that are preferably employed in the practice of this invention include iso-hexadecyl ethylene oxide 20, SURFYNOL CTF-111, TERGITOL 15-S-7, and amine oxides, such as N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadeeenyl)-N-amine oxide. The concentration of the amphiphile/surfactants may range from 0 to 5 wt %, preferably from about 0.1% to 2 wt %.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms. Preferred examples of biocides include Urarcide™ and Proxel™, and NuoCept™. Sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the colorants and polymers disclosed herein. The viscosity of the final ink composition is from about 0.8 to about 8 cPs, preferably from about 0.9 to about 4 cPs.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing include paper, textiles, wood, and plastic.

EXAMPLE 1

A series of black inks are prepared in a designed experiment. The common components of each ink are 3% proprietary anionic self-dispersing pigment, 9% 2-pyrrolidinone, 4% Liponics EG-1 (an oxyalkylated glycerol) and 0.2% Proxel-GXL biocide. The designed experiment is a three level design with 0.50%, 1.25% and 2.00% propylene glycol t-butyl ether (PtB) as the glycol ether and 0.35%, 0.525% and 0.70% Balance 47® as the polymer additive. Balance 47®0 is a copolymer of octylacrylamide, butylaminoethyl methacrylate, and other acrylate monomers (at least one of which is an acidic monomer), having an acid number of 140 mg KOH/g of polymer and available from National Starch. The polymer is neutralized with 0.14 g KOH per g of polymer. The balance of each formula is water and the pH is adjusted to 8.5 with dilute KOH. The inks are filled into ink-jet pens designed for the Hewlett-Packard Professional Series® 2000C ink-jet printer.

In this example, the black inks are printed at 100% density and underprinted with a 25% color density of an ink of the following composition: 7.5% 2-pyrrolidone, 8% 1,5-pentanediol, 5% succinic acid, 1.75% Tergitol 15-S-7, 4% KOH, Na-Direct Yellow 132 dye (Abs=0.12 at 1:10,000 dilution) and the balance is water. This results in an ink that is buffered at pH 4. The yellow ink is filled into a color ink-jet pen designed for the Hewlett-Packard Professional Series® 2000C ink-jet printer. Ten pages of Champion DataCopy® paper containing a 100% density black graphic and under printed with 25% yellow ink are printed on a Hewlett-Packard Professional Series® 2000C ink-jet printer at a rate of 14 pages per minute and allowed to stack in the output tray. The blotting from one page to another is graded using a 0–5 scale where 0 represents no blotting and 5 represents severe blotting. The resulting dry time scores are statistically analyzed using an interaction model. FIG. 1 shows the dry time score response surface that is generated from the analysis. The dry time scores for individual data points A–E are given in Table 1. The response surface not only indicates that the use of PtB and a specific polymer in the black ink aid in dry time, but that their combination is particularly advantageous.

Figure 2:
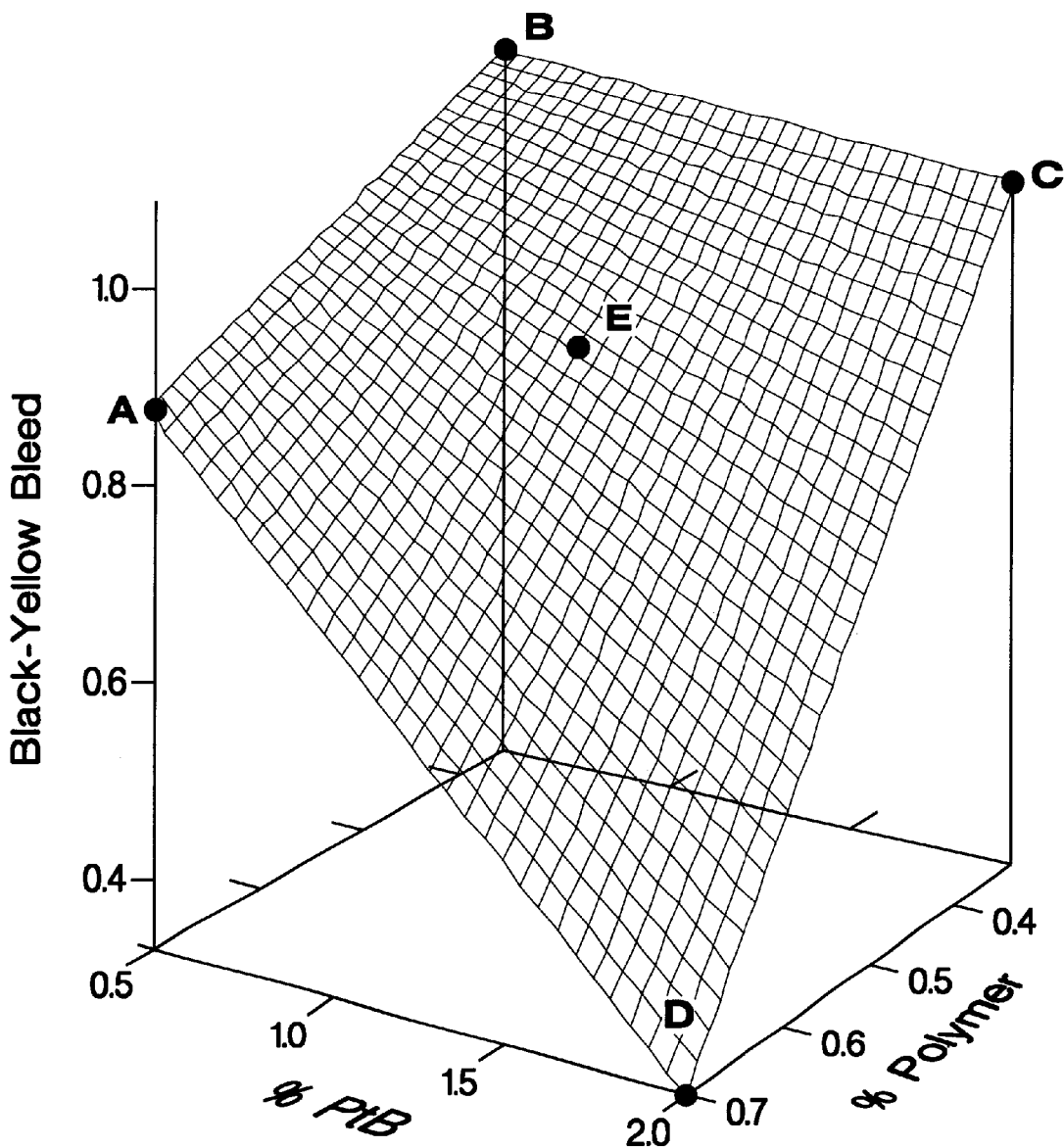
FIG. 2 is a three dimensional plot of black-yellow bleed versus the percentage of glycol ether (in this case PtB) and pH sensitive polymer (Balance 47™) present in the black ink. A table explaining the data points A, B, C, D, and E is shown in the Example.

The same inks and printer are also used to print an image where a black line measuring about 0.1 inch is printed and flanked by two yellow boxes of the above yellow ink. The amount of black-yellow bleed is determined by measuring the difference in the black line width (in mils) with and without the flanking yellow boxes. The graphic is printed on Gilbert Bond®, Champion DataCopy®, Union Camp Jamestown®, Hewlett-Packard Bright White®, Stora Papyrus Multicopy® and Stora Papyrus Natura® papers using all of the black inks described above. The bleed is measured and averaged across all 6 papers and statistically analyzed using an interaction model. FIG. 2 shows the black-color bleed response surface that is generated from the analysis. The bleed values for individual data points A–E are shown in Table 1. The response surface not only indicates that the use of PtB and a specific polymer in the black ink aid in bleed control, but that their combination is particularly advantageous. Halo is observed to be very good for all print samples.

TABLE 1

|   | % PtB | % Polymer | Dry Time Score | Black-Yellow Bleed (mils) |
|---|-------|-----------|----------------|---------------------------|
| A | 0.5   | 0.7       | 1.9            | 0.88                      |
| B | 0.5   | 0.35      | 2.4            | 1.08                      |
| C | 2     | 0.35      | 1.9            | 1.04                      |
| D | 2     | 0.7       | 1.5            | 0.33                      |
| E | 1.25  | 0.525     | 1.9            | 0.83                      |

EXAMPLE 2

Five black inks were prepared according to the formulations given in the table below; concentrations are expressed as weight percentages. They all contain 3% of a proprietary anionic self-dispersing pigment.

TABLE 2

| Ink Formula    | A  | B  | C  | D  | E   |
|----------------|----|----|----|----|-----|
| 2-Pyrrolidinone| 10 | 10 | 8  | 3  | 10  |
| Liponics EG1   | 4  | 4  | 4  | 4  | 4   |
| PtB            | 2  | 1  | 2  | 1  | 0   |
| Balance 47     | 1  | 1  | 1  | 1  | 1   |
| Surfynol 465   | 0  | 0  | 0  | 0  | 0.1 |
| Dry time (sec) | 21 | 26 | 19 | 29 | 55  |

All inks are adjusted to a pH of 8.5 using KOH. The inks are filled into HP 2000c ink-jet pens. Color ink is the same as in Example 1. Dry times are measured under similar conditions as in Example 1. Inks containing PtB dry significantly faster than the ink that does not contain PtB.

Industrial Applicability

The method of reducing dry time and bleed is expected to find use in ink-jet printing applications, especially those utilizing pigment-based inks.

What is claimed is:

1. An ink for ink-jet printing, said ink comprising a colorant comprising a self-dispersing pigment, at least one pH-sensitive polymer, and an effective amount of a glycol ether solvent to improve dry time, wherein said polymer comprises monomers having the following basic structure:

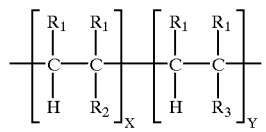

wherein $R_1$ are independently selected from H or a $C_1$–$C_{18}$ substituted or unsubstituted, branched or unbranched, alkyl, aromatic, or cyclic chain, optionally containing halogen, ester, ether, amine or amide functionalities; $R_2$ is a group selected from the group consisting of a moiety containing a carboxylic acid group, primary amine, secondary amine, tertiary amine, or mixtures thereof; and $R_3$ is a $C_1$–$C_{18}$ substituted or unsubstituted, branched or unbranched, alkyl, aromatic, or cyclic chain, optionally containing ester, ether, amine or amide functionalities; and further provided that at least one monomer is a basic amine group aid one monomer is an acid group, and one monomer is a N-substituted acrylamide wherein said substitution is a $C_1$–$C_{18}$ substituted or unsubstituted, branched or unbranched, alkyl, aromatic, or cyclic chain, wherein said polymer provides bleed control with an adjacently-printed ink that is superior to said ink without said polymer, and wherein said polymer and said glycol ether solvent together reduce dry time of said ink compared to an ink without said polymer and said glycol ether solvent together.

2. An ink for ink-jet printing according to claim 1 wherein said polymer has a weight average molecular weight of from about 1,000 to about 20,000.

3. An ink for ink-jet printing according to claim 1 wherein said $R_1$ are independently selected from the group consisting of H, $CH_3$, halogen, halogenated methyl group, or mixtures thereof.

4. An ink for ink-jet printing according to claim 1 wherein said polymer comprises monomers with carboxylic acid functionalities selected from the group consisting of acrylic acid, methacrylic acid, crotonic acid, 2-trifluoromethylacrylic acid, 2-bromoacrylic acid, and mixtures thereof.

5. An ink for ink-jet printing according to claim 4 wherein said polymers have an acidity, measured by the acid number, of from about 55 to about 400 mg KOH/g of polymer.

6. An ink for ink-jet printing according to claim 1 wherein said polymer comprises amine functionalities and are selected from the group consisting of 2-(diethylamino)ethyl acrylate, 2-(dimethylamino)ethyl acrylate, 3-(dimethylamino)propyl acrylate, butylaminoethyl methacrylate, 2-aminoethyl methacrylate, N-[3-(dimethylamino)propyl]acrylamide, and mixtures thereof.

7. An ink for ink-jet printing according to claim 6 wherein the amount of basic nitrogen in said polymers, measured as the meq of basic nitrogen per gram, is from about 1 to about 7 meq/g.

8. An ink for ink-jet printing according to claim 1 wherein said polymer comprises hydrophobic monomers selected from the group consisting of methyl esters and ethyl esters of acrylic, methacrylic acids, ethyl-2-(bromomethyl) acrylate, propyl acrylates, propyl methacrylates, butyl acrylates, butyl methacrylates, isoamyl acrylate, hexyl acrylates, hexyl methacrylates, cyclohexyl acrylates, cyclohexyl methacrylates, alkyl derivatives of cyclohexyl acrylates and methacrylates, ethylhexyl acrylates, ethylhexyl methacrylates, trimethylhexyl acrylate, isooctyl acrylate, isodecyl acrylate, dodecyl acrylate, tridecyl methacrylate, octadecyl acrylate, isobornyl acrylate, isobornyl methacrylate, phenyl methacrylate, benzyl methacrylate, 2-butoxyethyl acrylate, 2-butoxyethyl methacrylate, 2-ethoxyethyl acrylate, neopentyl glycol acrylate benzoate, ethylene glycol phenyl ether acrylate, hydroxybutyl acrylate, alkyl esters of crotonic acid, N,N-dimethylacrylamide, N-isopropylacrylamide and methacrylamide, N-octylacrylamide, N-(butoxymethyl) acrylamide, N-(isobutoxymethyl)acrylamide, methyl-2-acrylamido-2-methoxyacetate, vinyl acetate, vinyl neodecanoate, cyclohexyl vinyl ether, 2-ethylhexyl vinyl ether, styrene, and mixtures thereof.

9. An ink for ink-jet printing according to claim 1 wherein said polymer comprises monomers having the following basic structure:

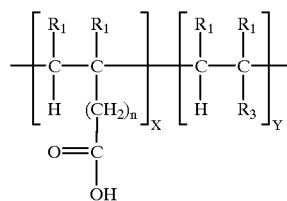

wherein $R_1$ are independently selected from H or a $C_1$–$C_8$ substituted or unsubstituted, branched or unbranched, alkyl, aromatic, or cyclic chain, optionally containing ester, ether, amine or amide functionalities; n is from 0 to about 15, so as long as the group has a $pK_a$ of from about 5 to about 7.5; and $R_3$ is a $C_1$–$C_{18}$ substituted or unsubstituted, branched or unbranched, alkyl, aromatic, or cyclic chain, optionally containing ester, ether, amine or amide functionalities.

10. An ink for ink-jet printing according to claim 9 wherein said polymer has a weight average molecular weight of from about 1,000 or about 20,000.

11. An ink for ink-jet printing according to claim 1 wherein said glycol ether is selected from the group consisting of: ethylene glycol alkyl ethers, propylene glycol alkyl ethers, poly(ethylene glycol) alkyl ethers, higher homologues of poly(ethylene glycol) alkyl ethers, poly(propylene glycol) alkyl ethers, higher homologues of poly(propylene glycol) alkyl ethers, and mixtures thereof.

12. An ink for ink-jet printing according to claim 1 wherein said ink is further formulated with an ink-jet vehicle.

13. An ink for ink-jet printing according to claim 1 wherein said ink is overprinted over a second ink on a print medium.

14. An ink for ink-jet printing according to claim 1 wherein said ink is underprinted under a second ink on a print medium.

15. An ink for ink-jet printing comprising:
   a. from about 0.001% to about 10 wt % of a colorant comprising a self-dispersing, pigment;
   b. from about 0.1% to about 10 wt % of at least one pH-sensitive polymer, and
   c. from about 0.01% to about 10 wt % of a glycol ether solvent;

wherein said pH-sensitive polymer comprises monomers having the following basic structure:

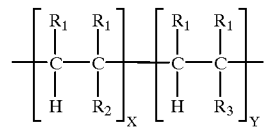

wherein $R_1$ are independently selected from H or a $C_1$–$C_{18}$ substituted or unsubstituted, branched or unbranched, alkyl, aromatic, or cyclic chain, optionally containing halogen, ester, ether, amine or amide functionalities; $R_2$ is a group selected from the group consisting of a moiety containing a carboxylic acid group, primary amine, secondary amine, tertiary amine, or mixtures thereof; and $R_3$ is a $C_1$–$C_{18}$ substituted or unsubstituted, branched or unbranched, alkyl, aromatic, or cyclic chain, optionally containing ester, ether, amine or amide functionalities; and further provided that it least one monomer is a basic amine group and one monomer is an acid group, and one monomer is a N-substituted acrylamide wherein said substitution is a $C_1$–$C_{18}$ substituted or unsubstituted, branched or unbranched, alkyl, aromatic, or cyclic chain, wherein said polymer provides bleed control with an adjacently-printed ink that is superior to said ink without said polymer, and wherein said polymer and said glycol ether solvent together reduce dry time of said ink compared to an ink without said polymer and said glycol ether solvent together.

16. An ink for ink-jet printing according to claim 15 wherein said glycol ether is propylene glycol t-butyl ether.

17. An ink for ink-jet printing according to claim 15 wherein said pH sensitive polymer is a copolymer of octylacrylamide, butylaminoethyl methacrylate, and at least one acidic, acrylate monomer having an acid number of 140 mg KOH/g of polymer.

* * * * *

UNITED STATES PATENT AND TRADEMARK OFFICE
CERTIFICATE OF CORRECTION

PATENT NO.   : 6,300,391 B2
DATED        : October 9, 2001
INVENTOR(S)  : Parazak et al.

It is certified that error appears in the above-identified patent and that said Letters Patent is hereby corrected as shown below:

Column 13,
Line 16, delete "$C_1 - C_8$" and insert -- $C_1 - C_{18}$ --.

Signed and Sealed this

Twelfth Day of November, 2002

*Attest:*

JAMES E. ROGAN
*Attesting Officer*     *Director of the United States Patent and Trademark Office*